Nov. 6, 1956  L. H. MORIN  2,769,204
METHOD OF PRODUCING PLASTIC SHROUDED SPOOLS
Filed July 12, 1951  2 Sheets-Sheet 1
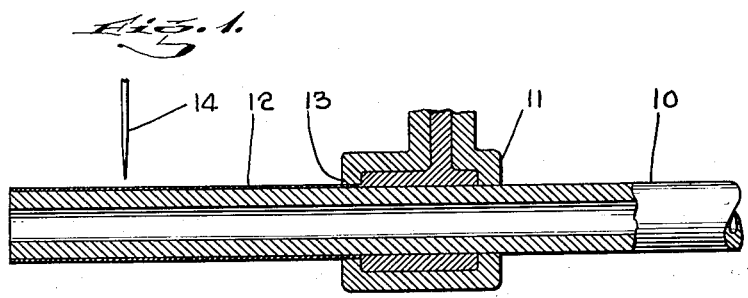
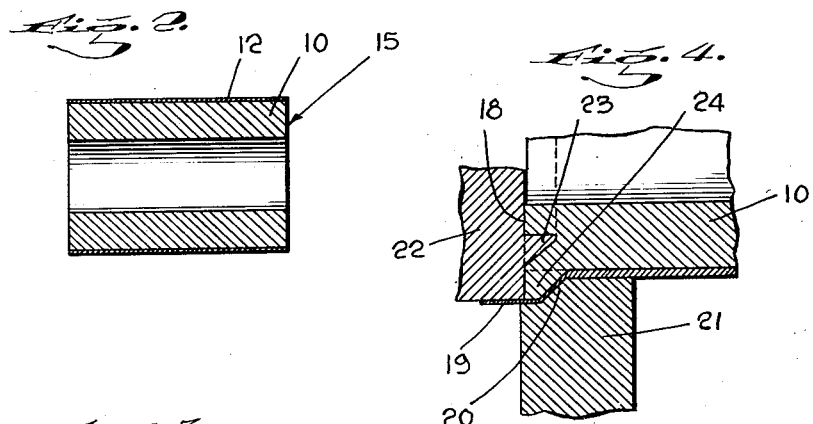
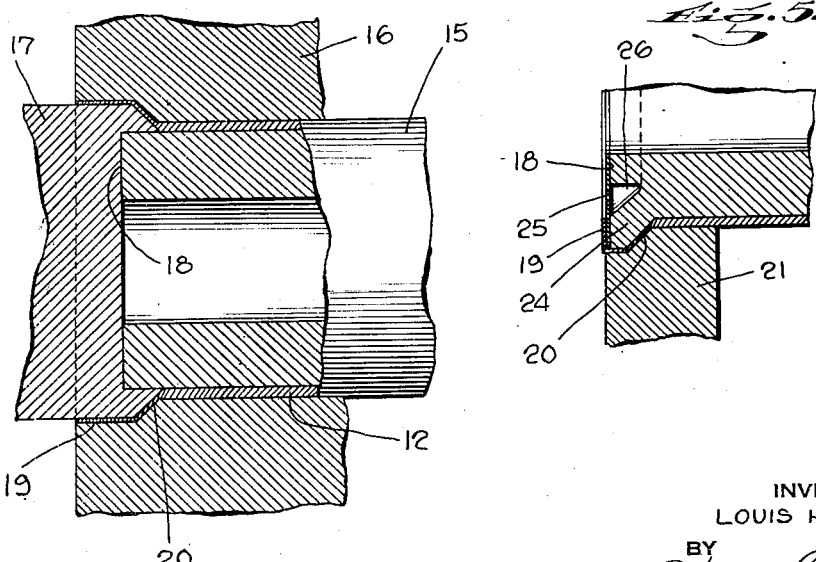
INVENTOR
LOUIS H. MORIN
BY
*Howard E. Thompson*
ATTORNEY Nov. 6, 1956     L. H. MORIN     2,769,204
METHOD OF PRODUCING PLASTIC SHROUDED SPOOLS
Filed July 12, 1951     2 Sheets-Sheet 2
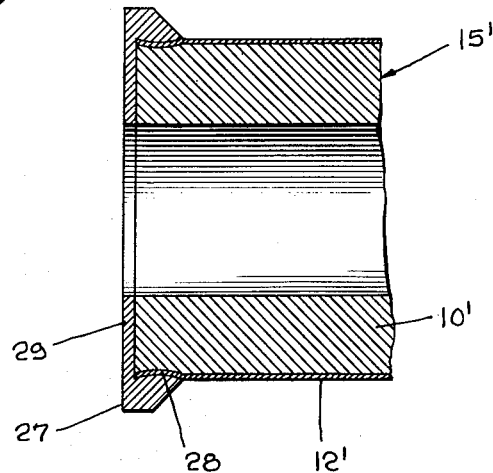
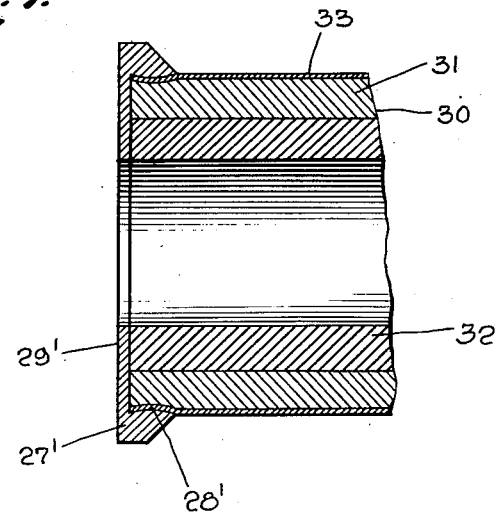
INVENTOR
LOUIS H. MORIN
BY
ATTORNEY United States Patent Office 2,769,204
Patented Nov. 6, 1956

2,769,204

METHOD OF PRODUCING PLASTIC SHROUDED SPOOLS

Louis H. Morin, Bronx, N. Y., assignor to Coats & Clark Inc., a corporation of Delaware Application July 12, 1951, Serial No. 236,360

12 Claims. (Cl. 18—47.5)

This invention relates to the production of thread spools and the like. More particularly, the invention deals with a spool including a plastic shroud disposed on a tubular core. Still more particularly, the invention deals with a method of producing spools of the character described, wherein a plastic shroud is extruded onto a tubular core of paper or other similar material and, wherein, means is provided for forming a flange at each end of a workpiece to produce a more or less conventional type of spool body thereof.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view illustrating the application of an extruded plastic shell or shroud on a tubular core, preferably of paper.

Fig. 2 is a sectional detail view of a workpiece length severed from the extruded core, as illustrated in Fig. 1.

Fig. 3 is an enlarged sectional view, showing one end portion of a workpiece, illustrating the first step in forming a flanged end on the workpiece.

Fig. 4 is a view similar to Fig. 3 showing only part of the construction and illustrating the next step in the process of forming the flanged end of the workpiece.

Fig. 5 is a view similar to Fig. 4, showing the finishing of the flanged end of the workpiece.

Fig. 6 is a view similar to Fig. 5 showing another method of forming a flange on the end of a workpiece, as shown in Fig. 2; and Fig. 7 is a view similar to Fig. 6 showing a core composed of two tubular bodies.

In Fig. 1 of the drawing, I have diagrammatically illustrated the method of producing workpiece spool lengths from which thread spools can be produced in accordance with my improved method. In said figure, 10 represents a tubular paper core, composed of pressed paper, or similar material, capable of being fashioned in accordance with the method more fully hereinafter set forth. This core is passed through what might be termed a nozzle head 11 of an extruding machine, not shown, the plastic material within the head being adapted to apply onto the tubular core 10 a plastic shell or shroud 12, the thickness of which is controlled by the nozzle end 13 of the head 11. It will be understood that the core 10 is fed through the head 11 at a predetermined speed enabling the formation of the shell 12 thereon and, at a predetermined distance from the head 11, cutter means, as diagrammatically illustrated at 14, will be employed to sever workpiece lengths from the product, similar to the workpiece 15 shown in Fig. 2 of the drawing. The workpiece comprises the core 10 and shell 12 extending to the ends of the core, as seen.

The next step in the method of producing the resulting spool consists in arranging one end portion of the workpiece 15 in a suitable tool or die 16 and advancing a spreader and forming tool 17 in the direction of the end 18 of the workpiece 15 to expand and form the outer portion of the shell 12 adjacent the end 18 to form a thin wall portion 19, greater in diameter than the shell 12 and joining the shell 12 inwardly of the end 18 in a bevelled wall portion 20. This operation is performed under heat, the die 16 being heated in any desired manner, as is also the forming tool 17, the heat employed being sufficient only to soften the plastic shell 12.

The product, as formed by the step shown in Fig. 3, is then arranged in a tool or die 21, note Fig. 4, recessed to receive and back-up the bevelled portion 20 and part of the extending thin wall 19 and then another forming or spreader tool 22, having an annular bevelled spreader ring 23 is moved in the direction of the end 18 of the core 10 to expand the outer free end portion of the core 10 into the offset and bevelled portions 19 and 20 in forming what might be termed an annular flange forming ring 24. The result of this operation still leaves a major portion of the annular wall 19 protruding beyond the surface 18 and, by means of a suitable and preferably heated tool, this protruding portion is spun or turned inwardly upon the flange 24, and, preferably, upon a disc 25 disposed upon the surface 18, prior to this operation to which it may be cemented, if desired. The disc 25 will serve to cover and conceal the annular recess 26 produced in forming the flange 24, as will be apparent. As may be seen, the annular wall 19 forms a ring overlying the end of the spool. A ticket may be adhered to the ring, covering disc 25.

The above operation can be performed while leaving the workpiece supported in the tool or die 21. The steps described in connection with Figs. 4 and 5 may also be performed while the workpiece is in the die 16.

After one end portion of the workpiece 15 has been formed in the manner defined, the other end portion will be correspondingly formed and, as a result, a spool having flanged ends will be produced, the flanges as well as the periphery of the spool body being covered by the plastic material. Also, both end portions of the workpiece may be formed simultaneously, and flanges for both ends formed at the same time.

In Fig. 6 of the drawing, I have shown another adaptation of flanging a workpiece, similar to that shown at 15 in Fig. 2 of the drawing and, in Fig. 6, this workpiece is designated by the reference character 15' and at 12' is shown the shell or shroud disposed upon the tubular core 10'. With this construction, a plastic rim portion 27 is moulded upon each end of the workpiece 15' and this operation may be accomplished by first forming an annular depression 28 in the workpiece by means of a suitable forming tool to key the rim portion onto the core body or the moulding operation itself may be relied upon to apply sufficient circumferential pressure to the workpiece to form a depression or anchorage, as at 28.

The rim 27 includes a facing disc or ring 29 which covers the outer end of the core 10' and this may be utilized as a means of marking, labeling or identifying the spool product by characterizing the mould employed to form the markings on the surface of the disc or ring portion 29.

In Fig. 7 of the drawing, I have shown at 30 a modified form of workpiece, which comprises an outer core 31, preferably of paper composition, similar to the cores 10, 10' and an inner core member 32, which may be in the form of any type or kind of tubular body and have a harder or firmer consistency than the outer core 31.

In the process, as illustrated in Fig. 1, the two united or joined cores 31, 32 are fed through a head, similar to the head 11, in applying a shroud or shell 33 thereon and the resulting product is cut into workpiece lengths similar to the workpiece shown in Fig. 2 of the drawing and, in Fig. 7, this workpiece is designated by the reference character 30.

Aside from this modification, the structure of Fig. 7 is identical with Fig. 6, in other words, at 27' is shown a moulded plastic rim, anchored to the depressed or recessed portion 28' in the outer core 31 and at 29' is shown the facing disc or ring of the rim 27.

It will be understood that, with the method as illustrated in Figs. 1 to 5, inclusive, the moulds, such as 16 and 21, will be split moulds, facilitating mounting and displacement of the spool therefrom and with a method of first extruding a plastic shell, shroud or jacket on a tubular core body and, then forming the rim on workpieces fashioned from the extruded tube, spools can be produced very economically and at relatively high speed.

As will be appreciated, the invention provides spools that are light in weight and yet strong enough to withstand the handling to which spools are customarily subjected. In addition, the plastic covered flanges may be slitted to furnish nicks for holding the thread or strand end to prevent unravelling. Such nicks have the advantage of being non-chippable, that is, they are not subject to being broken away to render them useless for their purpose, as frequently occurs with conventional wood spools.

Referring again to disc 25 in Fig. 5, it may be noted that this disc also serves to support and strengthen the ends or end faces of the spool.

It will also be apparent that the plastic material employed can be produced in colors that would either be neutral or in harmony with colors of threads or strands arranged upon the spools.

In the operation of expanding the core 10 to form the flange 24 by the spreader ring 23, it will be understood that a mandrel or other supporting tool will be disposed in the bore of the core 10. This will maintain the diameter of the bore and prevent any inward flare of the material on the core 10.

Having fully described my invention, what I claim as new and desire to secure by Letters Patent is:

1. The method of making spools each comprising a flanged barrel from paper tubing which comprises continuously extruding plastic upon the outer cylindrical surface of a paper tube to form a plastic shell on the tube, severing the plastic covered tube into lengths to form the barrel of each spool, forming an annular recess at each end portion of each barrel, and forming an annular flange at each said end portion outwardly of said annular recess, said flange being at least partially made of plastic material.

2. The herein described method of producing plastic shrouded spools, which consists in extruding a plastic shell onto a tubular paper core, cutting the plastic covered paper core into workpiece lengths, forming, at end portions of each workpiece, outwardly protruding annular plastic flanges, including inwardly extending ring portions overlying the end faces of said workpiece, and coincidently with said forming step shaping said end portions of the workpiece to anchor the flanges thereon.

3. The herein described method of producing spools which consists in feeding a tubular paper core through plastic extruding means for forming a plastic shell on said core, severing the plastic covered paper core to form workpiece lengths, spreading and shaping each end of the plastic shell to form a circumferentially enlarged and outwardly extending rim forming portion, then expanding outer portions only of the ends of the paper core into said rim forming portions, then placing rings upon the ends of said paper core within said rim forming portions, and then inwardly turning the extremities of the rim forming portions onto said rings.

4. The herein described method of producing spools which consists in feeding a tubular paper core through plastic extruding means for forming a plastic shell on said core, severing the plastic covered paper core to form workpiece lengths, then moulding rim portions on the ends of the workpiece to form rim ends for the resulting spool, and recessing the end portions of the workpiece in application of the rims thereto.

5. The herein described method of producing plastic shrouded spools, which consists in extruding a plastic shell onto a double walled tubular body, cutting the plastic covered tubular body into spool barrel lengths, forming annular recessed means in each end portion of a length, and coincidently with said last-mentioned step forming a plastic protruding flange on each end portion of said length and outwardly of said annular recessed means to form a spool.

6. The method of making spools consisting of flanged barrels from paper tubing which comprises continuously extruding upon the outer cylindrical surface of a continuous moving paper tube a layer of plastic material to form a plastic shell on said tube, severing the plastic covered tube into lengths to form the barrel of said spools, moulding upon each end portion of each barrel a plastic flange, said flange comprising (1) an annular rim portion which engages the annular cylindrical end portion of the barrel and (2) a ring portion integral with said rim portion and which overlies the end face of the barrel, and moulding each said plastic flange at a pressure sufficiently high as to indent the cylindrical end portion of the barrel to form an annular depression therein, said annular rim portion of the flange engaging said annular depression to aid in anchoring the flange to the barrel.

7. The method of making spools consisting of flanged barrels from paper tubing which comprises continuously extruding upon the outer cylindrical surface of a continuous moving paper tube a layer of plastic material to form a plastic shell on said tube, severing the plastic covered tube into lengths to form the barrels of said spools, detaching a portion of the plastic shell from each barrel at each end of the barrel while coincidently heating said detached shell portion, pressure forming the heated detached shell portion into (1) an annular portion of greater diameter than the original shell and into (2) an annular bevelled portion connecting said portion of greater diameter to said shell, expanding each end portion of the barrel by annularly displacing each said end portion outwardly of the barrel until the displaced portion engages the annular portion of the detached shell identified as (2) above and engages a part of the annular portion of the detached shell identified as (1) above, placing an annular supporting disc on each end face of the barrel, and turning over onto said disc the unengaged part of the annular portion of the detached shell identified as (1) above.

8. The method of making thread spools which comprises moving a continuous paper tube to and through an extruding station, said tube having smooth cylindrically shaped outer surfaces and a through bore defined by smooth cylindrically shaped walls, continuously extruding a layer consisting of plastic upon the outer surfaces of said moving tube to form a plastic shell on the tube, periodically severing the plastic covered tube into uniform lengths to form open-ended tubular pieces each having a plastic shell, end edges of the plastic shell of each piece being flush with end faces of the piece, forming annular recessed portions in each end portion of each piece by deforming said end portions, forming an annular flange at least partially composed of plastic material on each said end portion, and thereby producing thread spools each comprising an open-ended paper barrel having a through bore and a flange at each end portion of said barrel, at least a portion of each flange, including the outer surfaces thereof, being composed of plastic material.

9. The method of making thread spools which comprises moving a continuous paper tube to and through an extruding station, said tube having smooth cylindrically shaped outer surfaces and a through bore defined by smooth cylindrically shaped walls, continuously extruding a layer consisting of plastic upon the outer surfaces of said moving tube to form a plastic shell on the tube, periodically severing the plastic covered tube into uniform lengths to form open-ended tubular pieces each having a plastic shell, end edges of the plastic shell of each piece being flush with end faces of the piece, forming annular flanges at least partially made of plastic material on each end portion of each piece, deforming each said end portion, engaging said plastic material of each flange with said deformed end portion, and thereby producing thread spools each comprising an open-ended paper barrel having a through bore and a flange at each end portion of said barrel, at least a portion of each flange, including the outer surfaces thereof, being composed of plastic material.

10. The method of making thread spools which comprises moving a continuous tube of fibrous material to and through an extruding station, said tube having a through bore defined by smooth cylindrically shaped walls, continuously extruding plastic material upon outer surfaces of said moving tube to form a plastic shell on the tube, periodically severing the plastic covered tube to form tubular pieces each having a plastic shell, forming annular flanges at least partially made of plastic material on each end portion of each piece, deforming each said end portion, engaging said plastic material of each flange with said deformed end portion, and thereby producing thread spools each comprising an open-ended barrel having a through bore and a flange at each end portion of said barrel.

11. The method of making thread spools which comprises moving a continuous tube of fibrous material to and through an extruding station, continuously extruding plastic material upon outer surfaces of said moving tube to form a plastic shell on the tube, severing the plastic covered tube to form tubular pieces each having a plastic shell, forming annular recessed portions in each end portion of each piece by deforming said end portions, forming an annular flange at least partially composed of plastic material on each said end portion, engaging the plastic material of each flange with said deformed end portion, and thereby producing thread spools each comprising an open-ended barrel having a through bore and a flange at each end portion of said barrel.

12. The method of making spools from a continuous tube of deformable fibrous material which comprises continuously extruding upon the outer cylindrical surface of said tube a layer of plastic material to form a plastic shell on said tube, periodically severing the plastic covered tube into lengths to form the barrel of said spools, separating a portion of the plastic shell from each end of each barrel while coincidently heating said shell portion, expanding each end portion of the barrel by annularly displacing each said end portion radially outwardly of the barrel to form an annular flange, and turning over onto said flange said separated plastic shell portion to cover the flange.

References Cited in the file of this patent

UNITED STATES PATENTS

| | | | |
|---|---|---|---|
| 1,282,160 | Young | Oct. 22, | 1918 |
| 1,978,985 | Cobb | Oct. 30, | 1934 |
| 1,981,771 | Benge | Nov. 20, | 1934 |
| 2,287,277 | Ryder | June 23, | 1942 |
| 2,336,981 | Clickner | Dec. 14, | 1943 |
| 2,344,665 | Adams | Mar. 21, | 1944 |
| 2,437,884 | Maynard | Mar. 16, | 1948 |
| 2,451,046 | Rembert | Oct. 12, | 1948 |
| 2,624,073 | Pugh | Jan. 6, | 1953 |